United States Patent
Zhang et al.

(10) Patent No.: US 10,034,229 B2
(45) Date of Patent: Jul. 24, 2018

(54) METHODS, APPARATUS, NETWORK NODE, AND COMPUTER PROGRAM PRODUCT FOR DYNAMICALLY PROVIDING CDN SERVICE THROUGH MOBILE NETWORK

(71) Applicant: Telefonaktiebolaget L M Ericsson (publ), Stockholm (SE)

(72) Inventors: Shunliang Zhang, Beijing (CN); Xuejun Cai, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 260 days.

(21) Appl. No.: 14/897,967

(22) PCT Filed: Jun. 13, 2013

(86) PCT No.: PCT/CN2013/077147
§ 371 (c)(1),
(2) Date: Dec. 11, 2015

(87) PCT Pub. No.: WO2014/198030
PCT Pub. Date: Dec. 18, 2014

(65) Prior Publication Data
US 2016/0150464 A1 May 26, 2016

(51) Int. Cl.
*H04L 12/24* (2006.01)
*H04L 12/725* (2013.01)
(Continued)

(52) U.S. Cl.
CPC .......... *H04W 48/16* (2013.01); *H04L 12/6418* (2013.01); *H04L 12/66* (2013.01);
(Continued)

(58) Field of Classification Search
CPC ............... H04L 12/6418; H04L 45/306; H04L 61/3015; H04W 40/02; H04W 48/16
See application file for complete search history.

(56) References Cited

U.S. PATENT DOCUMENTS

2006/0291412 A1 12/2006 Naqvi et al.
2009/0047951 A1 2/2009 Yeoum et al.
(Continued)

FOREIGN PATENT DOCUMENTS

CN 101605353 A 12/2009
CN 101616058 A 12/2009
(Continued)

OTHER PUBLICATIONS

3GPP, "3rd Generation Partnership Project; Technical Specification Group Services and System Aspects; LIPA Mobility and SIPTO at the Local Network; (Release 12)", 3GPP TR 23.859 V0.6.0, Jul. 2012, 1-60.
(Continued)

*Primary Examiner* — Gbemileke J Onamuti
(74) *Attorney, Agent, or Firm* — Murphy, Bilak & Homiller, PLLC

(57) ABSTRACT

Embodiments of the disclosure provide a method, an apparatus, a wireless network node, and a computer program product for dynamically providing a CDN service at a first node through a mobile network. According to the method, service provision information is received from a second node, wherein the service provision information comprises information about at least one CDN DN for providing a CDN service requested by a UE. An inter-APN routing policy associated with the CDN service is generated based on the service provision information. The inter-APN routing policy is provided to enable the UE to access the CDN service based on the inter-APN routing policy.

8 Claims, 12 Drawing Sheets

(51) Int. Cl.
  *H04W 40/02* (2009.01)
  *H04W 48/16* (2009.01)
  *H04L 12/64* (2006.01)
  *H04L 12/66* (2006.01)
  *H04L 29/12* (2006.01)

(52) U.S. Cl.
  CPC ........ *H04L 41/0893* (2013.01); *H04L 41/509* (2013.01); *H04L 41/5054* (2013.01); *H04L 45/306* (2013.01); *H04L 61/3015* (2013.01); *H04W 40/02* (2013.01)

(56) References Cited

U.S. PATENT DOCUMENTS

| | | |
|---|---|---|
| 2009/0318147 A1 | 12/2009 | Zhang et al. |
| 2011/0007748 A1 | 1/2011 | Yin et al. |
| 2011/0111758 A1 | 5/2011 | Liu et al. |
| 2011/0131338 A1 | 6/2011 | Hu |
| 2011/0235614 A1 | 9/2011 | Lerzer et al. |
| 2011/0320554 A1 | 12/2011 | Melander et al. |
| 2012/0003980 A1 | 1/2012 | Lim et al. |
| 2012/0036266 A1 | 2/2012 | Yin et al. |
| 2012/0099429 A1 | 4/2012 | Ludwig et al. |
| 2012/0166618 A1* | 6/2012 | Dahod ............... H04L 12/66 709/224 |
| 2012/0218975 A1 | 8/2012 | Aramoto et al. |
| 2012/0224536 A1 | 9/2012 | Hahn et al. |
| 2012/0269167 A1 | 10/2012 | Velev et al. |
| 2012/0284756 A1 | 11/2012 | Kotecha et al. |
| 2012/0294163 A1 | 11/2012 | Turtinen et al. |
| 2013/0007287 A1 | 1/2013 | Chu et al. |
| 2013/0034057 A1 | 2/2013 | Aramoto et al. |
| 2013/0051326 A1 | 2/2013 | Jeyatharan et al. |
| 2013/0053027 A1 | 2/2013 | Lau et al. |
| 2013/0064086 A1 | 3/2013 | Hall et al. |
| 2013/0089076 A1 | 4/2013 | Olvera-Hernandez et al. |
| 2013/0097305 A1 | 4/2013 | Albal |
| 2013/0114432 A1 | 5/2013 | Haynes |
| 2013/0155903 A1 | 6/2013 | Bi et al. |
| 2013/0157661 A1 | 6/2013 | Bhaskaran et al. |
| 2013/0230011 A1 | 9/2013 | Rinne et al. |
| 2013/0230024 A1 | 9/2013 | Lim et al. |
| 2014/0105011 A1 | 4/2014 | Chandramouli et al. |
| 2014/0177446 A1 | 6/2014 | Sun et al. |
| 2014/0206349 A1 | 7/2014 | Bertrand et al. |
| 2014/0219093 A1 | 8/2014 | Damola et al. |
| 2014/0254382 A1* | 9/2014 | Randriamasy ........ H04W 40/36 370/235 |

FOREIGN PATENT DOCUMENTS

| | | |
|---|---|---|
| CN | 102014053 A | 4/2011 |
| CN | 102202418 A | 9/2011 |
| CN | 102356616 A | 2/2012 |
| WO | 2011137564 A1 | 11/2011 |
| WO | 2011144700 A1 | 11/2011 |
| WO | 2012052064 A1 | 4/2012 |
| WO | 2012052067 A1 | 4/2012 |
| WO | 2012052568 A1 | 4/2012 |
| WO | 2012088140 A2 | 6/2012 |
| WO | 2012112571 A1 | 8/2012 |
| WO | 2012172384 A1 | 12/2012 |
| WO | 2013001230 A1 | 1/2013 |
| WO | 2013022219 A1 | 2/2013 |
| WO | 2013143072 A1 | 10/2013 |

OTHER PUBLICATIONS

Unknown, Author, "Device Management Architecture", Open Mobile Alliance, Candidate Version 2.0, OMA-AD-DM-V2_0-20120531-C, May 31, 2012, 1-16.
3GPP, "3rd Generation Partnership Project; Technical Specification Group Services and System Aspects; Local IP Access and Selected IP Traffic Offload (LIPA-SIPTO) (Release 10)", 3GPP TR 23.829 V10.0.1 (Oct. 2011), Oct. 2011, 1-43.
Ma, Longjiao et al, "Traffic Offload Mechanism in EPC based on Bearer Type", Wireless Communications, Networking and Mobile Computing, 2011 7th International Conference, IEEE, 2011, 1-4.
Unknown, Author, "Discussion on LIPA_SIPTO Solution", 3GPP TSG SA WG2 Meeting #76, TD S2-096637, Nov. 16-20, 2009, Cabo, Mexico, 2009, 1-6.
3GPP, "3rd Generation Partnership Project; Technical Specification Group Services and System Aspects; Architecture enhancements for non-3GPP accesses (Release 12)", 3GPP TS 23.402 V12.0.0 (Mar. 2013), Mar. 2013, 1-253.

* cited by examiner

METHODS, APPARATUS, NETWORK NODE, AND COMPUTER PROGRAM PRODUCT FOR DYNAMICALLY PROVIDING CDN SERVICE THROUGH MOBILE NETWORK

TECHNICAL FIELD

Embodiments of the present invention generally relate to communication techniques. More particularly, embodiments of the present invention relate to a method, an apparatus, an access network discovery and selection function (ANDSF) node, a network gateway, a content distribution network (CDN) control node and a computer program product for dynamically providing a CDN service through a mobile network.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Recently, due to the quick growth of smart phone penetration, data traffic on a mobile network (e.g. general packet radio service (GPRS), enhanced data rates for global system for mobile (GSM) evolution (EDGE), and third generation (3G)) is experiencing explosive growth. In particular, more affordable service and application are expected by end users. Therefore, most of operators are facing the challenge to offload their overloaded networks and reduce the transport and peering cost. Under the situation, a content distribution network (CDN) as a potential approach for content delivery or acceleration is attracting more and more attention. A content distribution network may comprise a control node (CN) and at least one distribution node (DN). Data are available from the at least DN and are, for example, replicated in multiple DNs. Such data may be associated with a service requested by a user equipment (UE) associated with an end user. The principle of the CDN is that, at least one distribution node is selected by the control node of the CDN upon a request of the UE for a specific service (e.g., content), so as to provide the requested service to the UE. By replicating the content into the location as close as end users, the delivery performance (e.g., latency, packet loss) can be improved, and the transport and peering cost can be saved as well.

Accordingly, how to introduce a CDN system into a mobile network infrastructure makes more sense. However, when introducing the CDN system into a mobile network, e.g. one or more CDN DNs may be deployed in a packet data network (PDN) connected with a radio access network (RAN) or a PDN connected with a core network, there are many potential issues to be solved. One of them is how to set up an appropriate PDN connection and bearer over the PDN connection for a UE to access a CDN service to achieve the benefit of CDN and advantages of mobile networks.

Recently, to reduce transport cost and offload core network elements, in 3GPP TR 23.859 0.6.0 "Local IP access (LIPA) mobility and Selected IP Traffic Offload (SIPTO) at the local network", which is incorporated herein by reference in its entirety, there is a concept named as SIPTO/LIPA which focuses on the scenario that the UE requested content can be provided by local PDN. The principle of LIPA/SIPTO is that, for LIPA/SIPTO service, a specific APN is used by a UE to access related service subject to LIPA/SIPTO; and with the specific APN, a specific PDN connection is established between UE and Local PDN. However, to access a service subject to SIPTO/LIPA, the UE needs to provide a specific APN to set up a PDN connection to the local PDN network. Without the knowledge about the CDN DN(s) being selected by the CDN CN to serve the UE, it is difficult for the UE to figure out which APN should be used to access the CDN service to be provided by a specific CDN DN. An inappropriate APN used by the UE may result in unsuccessful access to the service subject to SIPTO/LIPA.

Generally, for facilitating a UE to access the mobile network, Open Mobile Alliance (OMA) Device Management (DM) may be employed. OMA DM is a protocol which may be used to configure and manage devices. As introduced in http://technical.openmobilealliance.org/technical/release_program/dm_v2_0.aspx, OMA DM may be used to configure operation specific information like access point name (APN) to UE to facilitate the network access. More details may be found in "Device Management Architecture," Candidate Version 2.0, 31 May 2012. Generally, such configuration is static. In the case that a CDN DN, which provides CDN service to a UE, is out of service or is removed from a PDN associated with the configured APN, the UE will not be able to access the CDN service any more.

In view of the foregoing problems, it would be desirable to dynamically provide, to a UE, information associated with a CDN service requested by the UE, to improve the probability of successful access.

SUMMARY

To address or mitigate at least one of the above potential problems, embodiments of the present invention would propose to dynamically provide to a UE information associated with a CDN service requested by the UE. Specifically, embodiments of the present invention provide solutions for providing to a UE an inter-APN routing policy associated with the requested CDN service, so that the UE accesses the CDN service based on the inter-APN routing policy.

According to a first aspect of the present invention, embodiments of the invention provide a method for dynamically providing a CDN service at a first node through a mobile network. According to the method, service provision information is received from a second node. The service provision information comprises information about at least one CDN DN for providing a CDN service requested by a UE. An inter-APN routing policy associated with the CDN service is generated based on the service provision information. The inter-APN routing policy is provided to enable the UE to access the CDN service based on the inter-APN routing policy.

According to a second aspect of the present invention, embodiments of the invention provide a method for dynamically providing a CDN service through a mobile network. According to the method, at least one CDN DN for providing a CDN service requested by a UE is determined. Service provision information about the at least one CDN DN is transmitted to enable an inter-APN routing policy associated with the CDN service to be generated based on the service provision information.

According to a third aspect of the present invention, embodiments of the invention provide an apparatus for dynamically providing a CDN service through a mobile network. The apparatus comprises a receiver, a generator and a provider. The receiver is configured to receive service provision information. The service provision information comprises information about at least one CDN DN for providing a CDN service requested by a UE. The generator is configured to generate an inter-APN routing policy associated with the CDN service based on the service provision information. The provider is configured to provide the inter-APN routing policy to enable the UE to access the CDN service based on the inter-APN routing policy.

According to a fourth aspect of the present invention, embodiments of the invention provide an apparatus for dynamically providing a CDN service through a mobile network. The apparatus comprises a determiner and a transmitter. The determiner is configured to determine at least one CDN DN for providing a CDN service requested by a UE. The transmitter is configured to transmit service provision information about the at least one CDN DN, to enable an APN routing policy associated with the CDN service to be generated based on the service provision information.

According to a fifth aspect of the present invention, embodiments of the invention provide an ANDSF node or a network gateway comprising an apparatus according to embodiments according to the third aspect of the present invention.

According to a sixth aspect of the present invention, embodiments of the invention provide an content distribution network control node, comprising an apparatus according to embodiments according to the fourth aspect of the present invention.

According to a seventh aspect of the present invention, embodiments of the invention provide an apparatus for dynamically providing a CDN service through a mobile network. The apparatus comprises: at least one processor; and at least one memory including compute program instructions, wherein the at least one memory and computer program instructions are configured to, with the at least one processor, cause the apparatus at least to perform methods according to embodiments of the present invention.

According to an eighth aspect of the present invention, embodiments of the invention provide a computer program product. The computer program product comprises at least one computer readable storage medium having a computer readable program code portion stored thereon, and the computer readable program code portion may comprise program code instructions for performing methods according to embodiments of the present invention.

Compared with those existing solutions, the proposed solution dynamically provides, to a UE, an inter-APN routing policy associated with the requested CDN service, such that the probability of successful access is efficiently increased, and the benefit of CDN and advantages of mobile networks are achieved.

Other features and advantages of the embodiments of the present invention will also be apparent from the following description of specific embodiments when read in conjunction with the accompanying drawings, which illustrate, by way of example, the principles of embodiments of the invention.

BRIEF DESCRIPTION OF THE DRAWINGS

The embodiments of the present invention that are presented in the sense of examples and their advantages are explained in greater detail below with reference to the accompanying drawings, in which.

Throughout the figures, same or similar reference numbers indicate same or similar elements.

DETAILED DESCRIPTION

Figure 1:
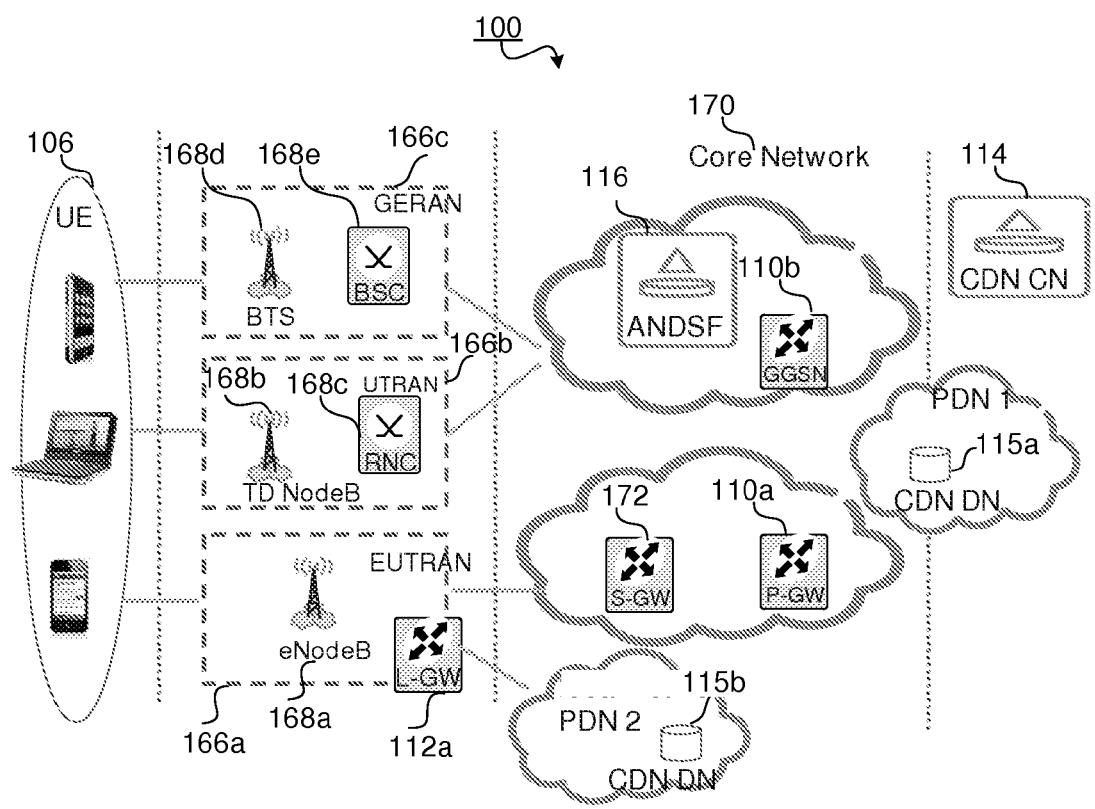
FIG. 1 illustrates a schematic diagram of a mobile network 100 in which a CDN service is to be provided to a UE according to embodiments of the invention.

Embodiments of the invention will be described thoroughly hereinafter with reference to the accompanying drawings. It will be apparent to those skilled in the art that the invention may, however, be embodied in many different forms and should not be construed as limited to the embodiments and specific details set forth herein. Like numbers refer to like elements throughout the specification.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Embodiments of the present invention may be applied in various wireless networks, including but not limited to a Wideband Code Division Multiple Access (WCDMA) network, a Long Term Evolution (LTE) network, a GSM network. Given the rapid development in communications, there will of course also be future type wireless communication technologies and systems with which the present invention may be embodied. It should not be seen as limiting the scope of the invention to only the aforementioned system.

In the context of the disclosure, the term "user equipment" or "UE" may refer to a terminal, a Mobile Terminal (MT), a Subscriber Station (SS), a Portable Subscriber Station (PSS), Mobile Station (MS), or an Access Terminal (AT), and so on. The UE may include some or all of the functions of the UE, the terminal, the MT, the SS, the PSS, the MS, or the AT.

The term "network node" may refer to, but not limited to, for example, a base station (BS), an ANDSF node, a network gateway, a CDN CN, a CDN DN, a server, and so on. The network gateway may be a packet network gateway (P-GW), a Gateway GPRS Support Node (GGSN), and so on. The network node may include some or all of the functions of the BS, the ANDSF node, the network gateway, the CDN CN, the CDN DN, or the server. In embodiments of the present invention, the term "first node" or "second node" represent different network nodes.

The term "ANDSF node" may refer to a network node having the access network discovery and selection function, that is, ANDSF. An ANDSF node, which is sometimes called as "ANDSF", is an entity within an evolved packet core (EPC) of the system architecture evolution (SAE) for 3GPP compliant mobile networks. The purpose of the ANDSF is to assist UE to discover non-3GPP access networks—such as Wi-Fi or WIMAX—that can be used for data communications in addition to 3GPP access networks (such as HSPA or LTE) and to provide the UE with rules policing the connection to these networks. The technical specification TR 23.853 "OPPIIS (Operator Policies for IP Interface Selection)", which is incorporated herein by reference in its entirety, relates to functions of ANDSF. According to embodiments of the present invention, an ANDSF node may be a separated network node, or may be implemented at a node having Policy and Charging Rules Function (PCRF) in the core network.

The term "CDN CN" is an abbreviation of a control node of a content distribution network, and may refer to a network node for controlling a content distribution network. The CDN CN may control one or more distribution nodes in the content distribution network, makes decisions about how to react to a content request and what to deliver and from which distribution node, control where copies of content is stored, and so on. The CDN CN may decide which specific (or a set of) distribution node(s) is used to serve a UE requesting a CDN service based on the request message from the UE and other CDN system dynamic information, such as load status of CDN DNs.

The term "CDN DN" is an abbreviation of a distribution node of a content distribution network, and may refer to a network node for distributing CDN service in a content distribution network. The CDN DN may store copies of contents, deliver the contents to a client, act on instructions from the control logic in the CDN (e.g., the CND CN), and so on. There may be one or more CDN DNs in the content distribution network. In context of mobile networks, the candidate CDN DNs may be deployed across different PDNs. For example, some CDN DNs may be deployed at local PDN, e.g., PDN connected to L-GW, and some CDN DNs may be deployed at normal PDN, e.g., PDN connected to P-GW/GGSN of core network.

The term "service provision information" may comprise information about at least one CDN DN for providing a CDN service requested by a UE. According to embodiments of the present invention, the service provision information may comprise: identification of CDN DN(s) selected by the CDN CN; identification of the UE requesting the CDN service; information about PDN(s) in which the selected CDN DN(s) is located; information about APN(s) associated with the one or more PDN(s); related CDN service description; and so on. The identification may be represented as an ID number, an IP address, e.g., in the form of a webpage address, and the like.

The term "inter-APN routing policy" is a traffic steering policy, which is associated with a CDN service requested by a UE. Specifically, the inter-APN routing policy may be used by an inter-APN capable UE to select an outgoing IP interface (e.g., PDN) based on the APN(s) in the inter-APN routing policy. According to the exemplary aspects of the present invention, an Access Point Name (APN) is used to identify a PDN for a mobile data user to communicate with. In addition to identifying the PDN, the APN may also be used to define the type of service. Examples of such connection-based services include a connection to wireless application protocol (WAP) server, messaging services (MMS), or an IMS service (e.g., VoIP, video telephony or text messaging) provided by a particular PDN. An APN is used in 3GPP data access networks, e.g. general packet radio service (GPRS), evolved packet core (EPC).

Embodiments of the present invention provide a method for dynamically providing a content distribution network (CDN) service through a mobile network. According to embodiments of the present invention, an inter-APN routing policy associated with a CDN service requested by a UE is generated for use by a UE to access CDN service requested by the UE. With the inter-APN routing policy, the UE may dynamically access the requested CDN service. In this way, the probability of successful access to CDN service is efficiently increased, and the benefit of CDN and advantages of mobile networks are achieved. Now some exemplary embodiments of the present invention will be described below with reference to the figures.

Reference is first made to FIG. 1, which illustrates a schematic diagram of a mobile network 100 in which a CDN service is to be provided to a UE according to embodiments of the invention.

As shown, the mobile network 100 comprises three radio access networks 166a, 166b and 166c which are configured as a LTE radio access network, a Time Division Synchronous Code Division Multiple Access (TD-SCDMA) radio access network and a GSM radio access network, respectively. An eNodeB 168a controls the LTE radio access network 166a. A Time Division (TD) NodeB 168b and a RNC 168c control the TD-SCDMA radio access network 166b. A BTS 168d and a BSC 168e control the GSM radio access network 166c. A core network 170 of the mobile network 100 comprises network gateways 110a and 110b. P-GW 110a is a gateway associated with the LTE radio access network 166a. GGSN 110b is a gateway associated with the TD-SCDMA network 166b and GSM radio access network 166c, respectively. A further node 172 of the core network 170 is a Signaling Gateway (S-GW). An edge entity 112a interfacing the LTE radio access network 166a and the core network 170 is configured as a L-GW 112a. A UE 106 may be configured, for example, as a smart phone, a laptop or a cellular phone.

In the mobile network 100, the UE 106 communicates with the core network 170 via radio access networks, e.g., 166a, 116b and 116c. There are exemplarily two PDNs, PDN 1 and PDN 2 in the network, wherein CDN DN 115a is located in PDN 1 and CDN DN 115b is located in PDN 2. The CDN DNs 115a and 115b are controlled by the CDN CN 114, respectively. An ANDSF node 116 is located in the core network and provides an inter-APN routing policy to a UE 106 to enable the UE to access a CDN service requested by the UE.

It is to be noted that although only two CDN DNs are deployed in the mobile network 100, there may be more or less CDN DNs in practice. It is also to be noted that although two PDNs, PDN 1 and PDN 2, have been shown in the mobile network 100, they are examples, rather than limitations. It is further to be noted that although a TD-SCDMA network is shown in the mobile network 100, it is just an example, rather than limitation. In practice, the embodiments of the present invention are applicable to WCDMA 3G access. For better understanding, the following embodiments of the present disclosure are described based on the mobile network shown in FIG. 1. As can be appreciated by those skilled in the art, the present disclosure can be applicable to any other suitable mobile network, but not limited to the specific arrangement shown in FIG. 1.

Figure 2:
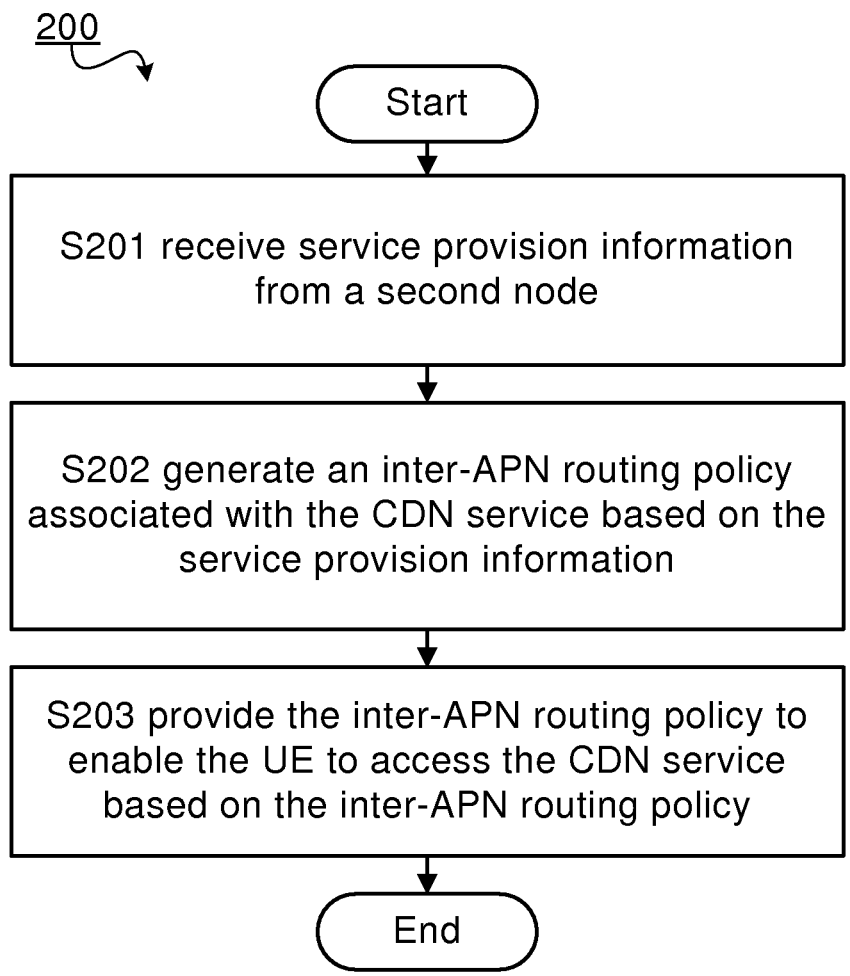
FIG. 2 illustrates a flow chart of a method 200 for dynamically providing a CDN service through a mobile network according to embodiments of the invention.

Reference is now made to FIG. 2, which illustrates a flow chart of a method 200 for dynamically providing a CDN service through a mobile network according to embodiments of the invention. In accordance with embodiments of the present invention, the method 200 may be carried out by a network node (sometimes called as a "first node"), such as an ANDSF node, a network gateway, and some other suitable device, or may be carried out by an apparatus implemented at the network node.

After the method 200 starts, at step S201, service provision information is received from a second node.

According to some exemplary embodiments of the present invention, the "second node" may be a further network node different from the "first node". In embodiments, the method 200 may be performed at an ANDSF node, and the service provision information may be received from a CDN CN. In further embodiments, the method 200 may be performed at an ANDSF node, and the service provision information may be received from a network gateway. In still further embodiments, the method 200 may be performed at a network gateway, and the service provision information may be received from a CDN CN.

According to embodiments of the present invention, at first, on the default bearer established over the existing PDN connection, a UE may send a message of Domain Name Server (DNS) request to find an IP address of a CDN content/service server. Based on information (e.g., Fully Qualified Domain Name (FQDN)) included in the message, a DNS node may find that the requested content/service is to be provided by a CDN system, then it may forward the message of the DNS request to the CDN control node. In response to receiving from the DNS node the message, which indicates that the UE is to access the CDN service, the CDN CN may select at least one CDN DN for providing the requested CDN service.

The service provision information may comprise information about the selected CDN DN. As discussed above, the service provision information may comprise at least identification of at least one selected CDN DN. In some embodiments, the service provision information may also comprise identification of the UE, information about PDN(s) and APN(s), related CDN service description (e.g., 5 tuple, service ID/name, URL etc), and so on.

At step S202, an inter-APN routing policy associated with the CDN service is generated based on the service provision information.

In accordance with exemplary embodiments of the present invention, before the inter-APN routing policy is generated, if there has been an inter-APN routing policy, the generated Inter-APN routing policy may be used to replace the existing inter-APN routing policy. In other words, the existing inter-APN routing policy may be updated with the generated Inter-APN routing policy.

At step S203, the inter-APN routing policy is provided to enable the UE to access the CDN service based on the inter-APN routing policy.

In accordance with exemplary embodiments of the present invention, the first node is an ANDSF node, and the second node is a CDN CN or a network gateway (e.g., a P-GW or a GGSN). In other words, the method 200 is performed at the ANDSF node. The service provision information may be received at the ANDSF node from the CDN CN directly. As an alternative, the service provision information may be first sent from the CDN CN to the network gateway, and then the network gateway may forward the service provision information to the ANDSF node. In other words, the service provision information may be received at the ANDSF node from the network gateway. The inter-APN routing policy may be generated at step S202 in several ways. For example, at least one APN associated with the CDN service to be provided by the at least one CDN DN may be first determined based on the service provision information, and the inter-APN routing policy may be then generated based on the at least one APN and the CDN service. The generated inter-APN routing policy may be provided from the ANDSF node to the UE at step S203, so that the UE may access its requested CDN service based on the inter-APN routing policy.

In accordance with exemplary embodiments of the present invention, the first node is an ANDSF node, and the second node is a network gateway (e.g., a P-GW, a GGSN, and so on). That is, the method 200 is also performed at the ANDSF node. The inter-APN routing policy may be generated at step S202 as follows. First, it is judged whether at least one APN associated with the CDN service to be provided by the at least one CDN DN is received from the network gateway. If the at least one APN is not received from the network gateway, the at least one APN may be determined based on the service provision information and/or at least one PDN associated with the at least one CDN DN. Then, the inter-APN routing policy may be generated based on the at least one APN and the CDN service. The generated inter-APN routing policy may be provided from the ANDSF node to the UE at step S203, so that the UE may access its requested CDN service based on the inter-APN routing policy.

In accordance with exemplary embodiments of the present invention, the first node is a network gateway (e.g., a P-GW or a GGSN), and the second node is a CDN CN. In this case, the method 200 is performed at the network gateway. Specifically, the network gateway may first determine at least one APN associated with the CDN service to be provided by the at least one CDN DN based on the service provision information received from the CDN CN; and then generate the inter-APN routing policy based on the at least one APN and the CDN service. The inter-APN routing policy may be then provided from the network gateway to an ANDSF node, so that the ANDSF node provides the inter-APN routing policy to the UE which requests for the CDN service.

According to embodiments of the present invention, when the first node is an ANDSF node, the method 200 may further comprise an optional step. Specifically, in response to receiving a request for policy and access network information with respect to the UE from a CDN CN, the policy and access network information may be sent from the ANDSF node to the CDN CN, such that the CDN CN may determine the at least one CDN DN based on the policy and access network information. In embodiments of the present invention, the policy and access network information may comprise: access network information, operator's traffic steering policy, inter-system routing policy, inter-system mobility policy, UE related inter-APN routing policy, and/or other useful information. Based on policy and access network information provided by the ANDSF node, the CDN CN may select a CDN DN more intelligently. For example, in case the UE related Inter-APN routing policy indicates a specific PDN is not permitted for a specific service, the CDN CN may avoid selecting a CDN DN located in such a PDN. Based on access network selection or routing policy for certain service, the CDN CN may select a CDN DN that is close to Point of Presence (POP) of the preferred access network.

Figure 3:
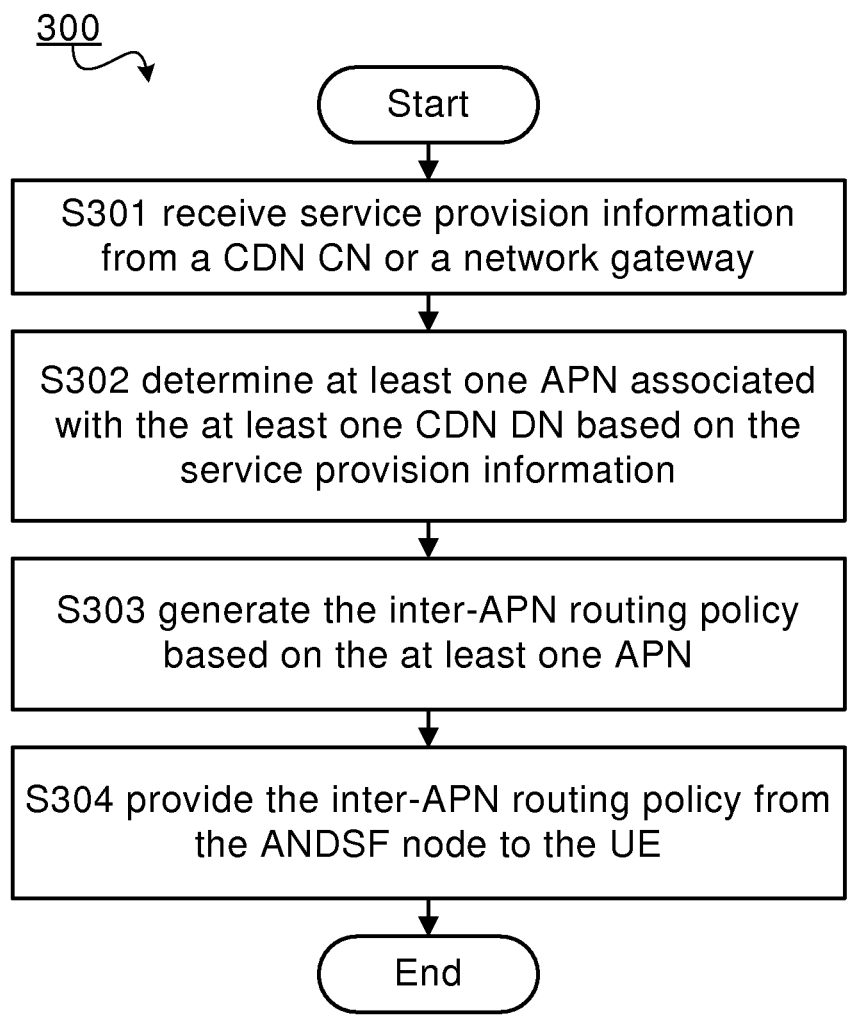
FIG. 3 illustrates a flow chart of a method 300 for dynamically providing a CDN service through a mobile network according to embodiments of the invention.

Reference is now made to FIG. 3, which illustrates a flow chart of a method 300 for dynamically providing a CDN service through a mobile network according to embodiments of the invention. The method 300 may be considered as an embodiment of the method 200 described above with reference to FIG. 2. In the following description of method 300, the service provision information is received at an ANDSF node from a CDN CN or a network gateway. As such, the ANDSF node may generate the inter-APN routing policy associated with the CDN service requested by a UE based on the received service provision information and provide the policy to the UE. However, it is noted that this is only for the purpose of illustrating the principles of the present invention, rather than limiting the scope thereof.

After the method 300 starts, at step S301, service provision information is received from a CDN CN or a network gateway.

In some embodiments of the present invention, the service provision information may be first sent from a CDN CN to the ANDSF node directly. In other words, the ANDSF node may receive the service provision information from the CDN CN. In some other embodiments of the present invention, the service provision information may be sent from a CDN CN to a network gateway which then forwards the information to the ANDSF node, thus the ANDSF node may receive the service provision information from the network gateway.

The network gateway may be configured as a PDN Gateway (P-GW) or a GPRS Support Node (GGSN) of a packet switched core network of the mobile network.

At step S302, at least one APN associated with the at least one CDN DN is determined based on the service provision information.

The APN is used to identify a PDN for a UE to communicate with. From the service provision information, the ANDSF node may, for example, extract the identification of at least one CDN DN selected by the CDN CN, identify a PDN in which the selected CDN DN is located, and determine an APN associated with the identified PDN.

At step S303, the inter-APN routing policy is generated based on the at least one APN.

In accordance with embodiments of the present invention, the inter-APN routing policy may be generated based on the at least one APN in several ways. For example, the inter-APN routing policy may be generated as comprising an APN associated with the identified PDN in which the selected CDN DN is located. Such an inter-APN routing policy may indicate that the UE may use the APN to access the PDN so as to be served by the selected CDN DN.

For another example, in the case that several CDN DNs are selected by the CDN CN, that is to say, any one of the CDN DNs may provide the CDN service requested by a UE, the inter-APN routing policy may be generated as comprising multiple APNs associated with PDNs in which the selected CDN DNs are located. Such an inter-APN routing policy may indicate that the UE may use any one of the APNs to access the associated PDN so as to be served by the CDN DN located in the PDN. In addition, such an inter-APN routing policy may comprise a list of the multiple APNs, which may be assigned with a priority level based on the service capability, throughput, workload, failure rate and the like of each associated PDN or CDN DN. When receiving the inter-APN routing policy, the UE will understand that there are multiple APNs which have the ability to provide the requested CDN service, and the UE may select one from these APNs according to their priority levels.

At step S304, the inter-APN routing policy is provided from the ANDSF node to the UE, such that the UE is enabled to access the CDN service based on the inter-APN routing policy.

Figure 4:
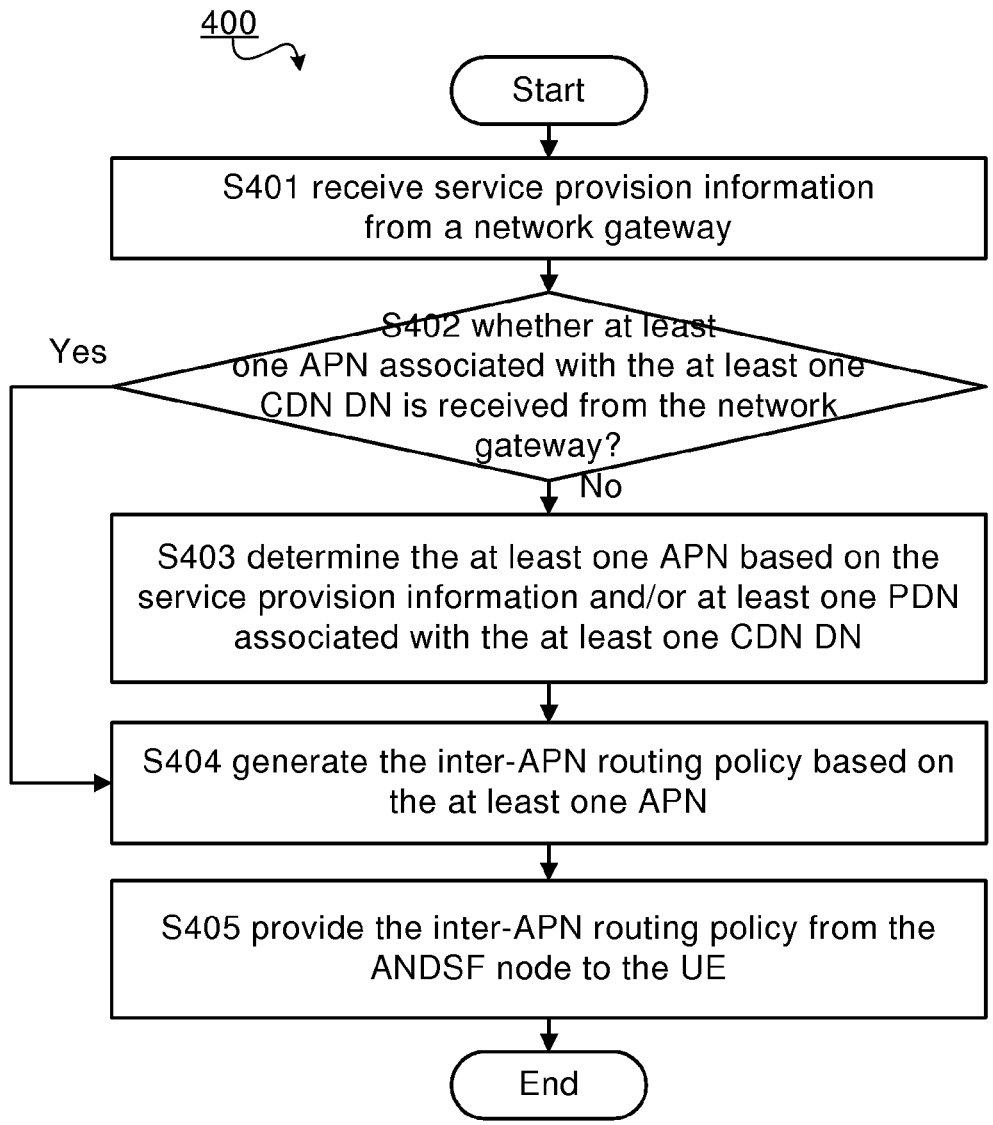
FIG. 4 illustrates a flow chart of a method 400 for dynamically providing a CDN service through a mobile network according to embodiments of the invention.

Reference is now made to FIG. 4, which illustrates a flow chart of a method 400 for dynamically providing a CDN service through a mobile network according to embodiments of the invention. The method 400 may be considered as an embodiment of the method 200 described above with reference to FIG. 2. Before the beginning of the method 400, the service provision information may be sent from a CDN CN to a network gateway, and the network gateway may determine further information regarding a PDN or APN associated with the CDN DN, add the further information into the service provision information, and send the service provision information to the ANDSF node. In the following description of method 400, the service provision information and/or the further information are received at an ANDSF node from the network gateway. The ANDSF node may utilize the received service provision information and/or the further information to generate the inter-APN routing policy associated with the CDN service requested by a UE, and then provide the policy to the UE. However, it is noted that this is only for the purpose of illustrating the principles of the present invention, rather than limiting the scope thereof.

After the method 400 starts, at step S401, service provision information is received from a network gateway. At step S402, whether at least one APN associated with the at least one CDN DN is received from the network gateway is judged. If the at least one APN is received, the flow goes to step S404; otherwise, the flow goes to step S403. At step S403, the at least one APN is determined based on the service provision information and/or at least one PDN associated with the at least one CDN DN. At step S404, the inter-APN routing policy is generated based on the at least one APN. At step S405, the inter-APN routing policy is provided from the ANDSF node to the UE.

According to embodiments of the present invention, the network gateway may receive from the CDN CN the service provision information and forward the received service provision information to the ANDSF node. At this time, the ANDSF node may receive, at step S401, the service provision information in which no further information regarding the PDN/APN is comprised. At step S402, the ANDSF node may determine that no APN associated with the at least one CDN DN is received from the network gateway. As such, the flow goes to step S403, at which the ANDSF node determines the APN based on the received service provision information. Step S404 in method 400 may be considered as being similar with step S303 in method 300 as described above. After generating the inter-APN routing policy based on the APN ate step S404, the ANDSF node may provide policy to the UE at step S405.

In some alternatives, the network gateway may receive from the CDN CN the service provision information and determine at least one PDN associated with the requested CDN service, for example, at least one PDN in which CDN DN(s) providing the requested CDN service are located. At this time, the ANDSF node may receive from the network gateway, at step S401, the service provision information comprising the further information regarding the determined PDN. At step S402, the ANDSF node may determine that no APN associated with the at least one CDN DN is received from the network gateway. As such, the flow goes to step S403, at which the ANDSF node determines the APN based on the received service provision information, in particular, the further information regarding the at least one PDN. After generating the inter-APN routing policy based on the APN at step S404, the ANDSF node may provide policy to the UE at step S405.

In further alternatives, the network gateway may receive from the CDN CN the service provision information and determine at least one APN associated with the requested CDN service. At this time, the ANDSF node may receive from the network gateway, at step S401, the service provision information comprising the further information regarding the determined APN. At step S402, the ANDSF node may determine that at least one APN associated with the at least one CDN DN is received from the network gateway. As such, the flow goes to step S404, at which the inter-APN routing policy is generated based on the APN. Thus, the ANDSF node may provide policy to the UE at step S405.

Figure 5:
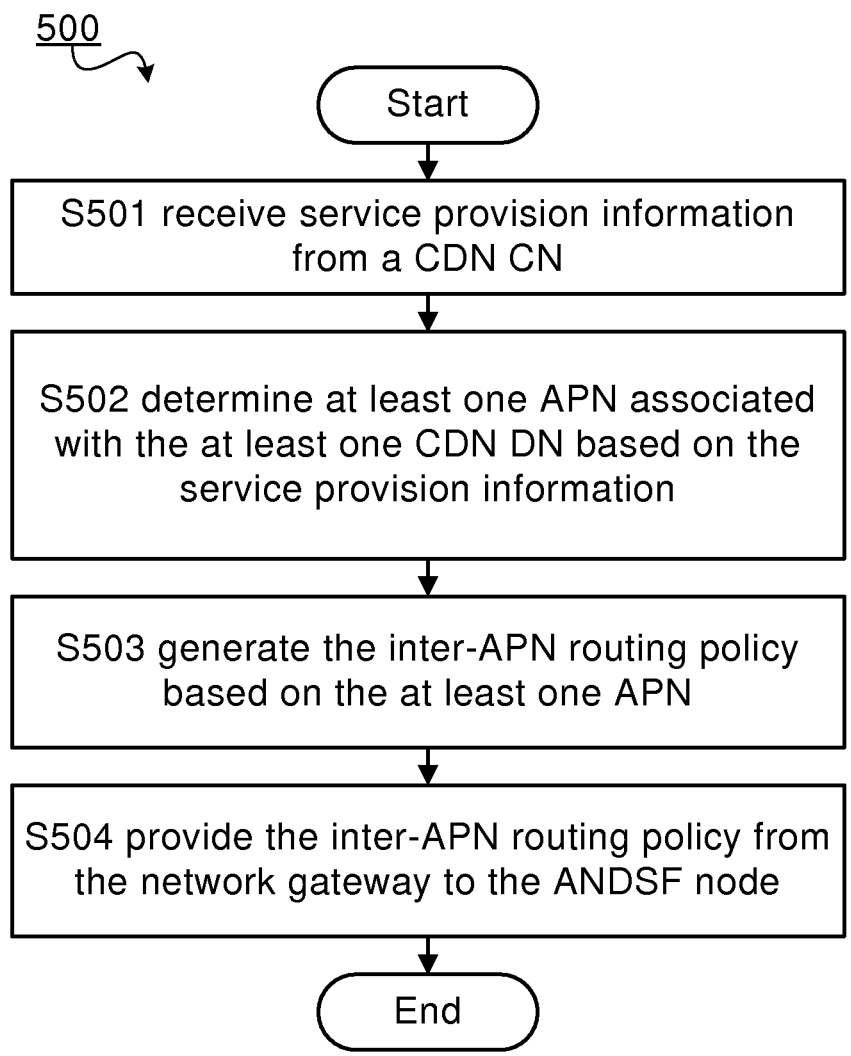
FIG. 5 illustrates a flow chart of a method 500 for dynamically providing a CDN service through a mobile network according to embodiments of the invention.

Reference is now made to FIG. 5, which illustrates a flow chart of a method 500 for dynamically providing a CDN service through a mobile network according to embodiments of the invention. The method 500 may be considered as an embodiment of the method 200 described above with reference to FIG. 2. Different from embodiments in connection with the methods 300 and 400, embodiments of the method 500 may be implemented at a network gateway, instead of an ANDSF node. In the following description of the method 500, the service provision information is received at a network gateway from a CDN CN. As such, the network gateway may generate the inter-APN routing policy associated with the CDN service requested by a UE based on the received service provision information and provide the policy to an ANDSF node. However, it is noted that this is only for the purpose of illustrating the principles of the present invention, rather than limiting the scope thereof.

After the method 500 starts, at step S501, service provision information is received from a CDN CN. At step S502, at least one APN associated with the at least one CDN DN is determined based on the service provision information. At step S503, the inter-APN routing policy is generated based on the at least one APN. Steps S502 and S503 in method 500 may be considered as being similar with steps S302 and S303 in method 300 as described above, which are not detailed here. At step S504, the inter-APN routing policy is provided from the network gateway to the ANDSF node. The ANDSF node, when receiving the inter-APN routing policy, may forward to it the UE requesting for the CDN service. In this way, the UE is enabled to access the requested CDN service.

Figure 6:
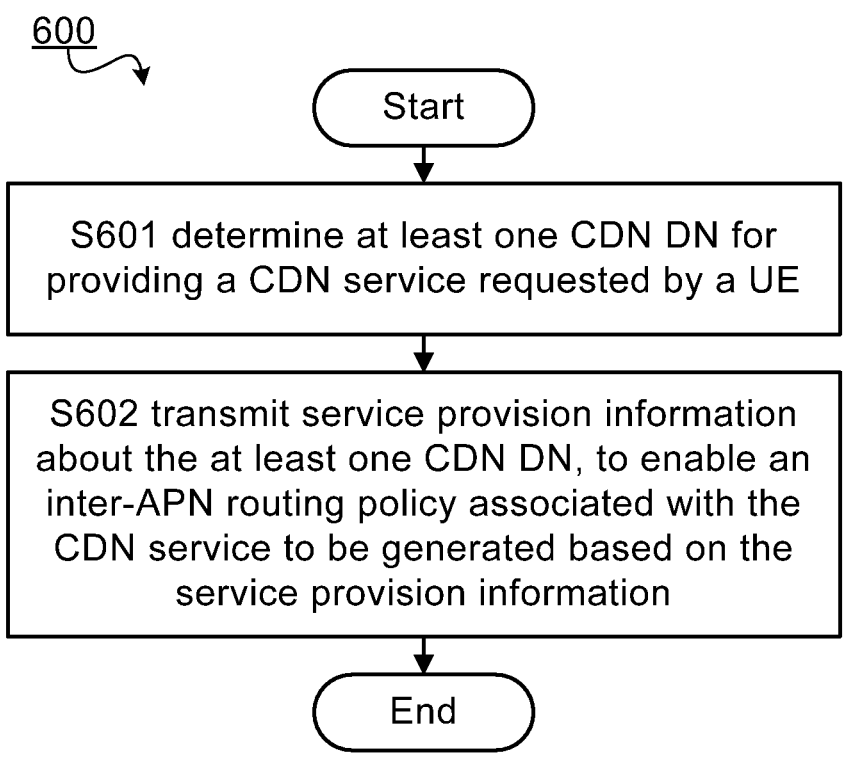
FIG. 6 illustrates a flow chart of a method 600 for dynamically providing a CDN service through a mobile network according to embodiments of the invention.

Reference is now made to FIG. 6, which illustrates a flow chart of a method 600 for dynamically providing a CDN service through a mobile network according to embodiments of the invention. In accordance with embodiments of the present invention, the method 600 may be carried out by a network node, for example, a control node of a content distribution network (CDN CN), and some other suitable device.

After the method 600 starts, at step S601, at least one CDN DN for providing a CDN service requested by a UE is determined.

According to exemplary embodiments of the present invention, a CDN DN may be determined in several ways. In some embodiments, the CDN CN may determine at least one CDN DN for providing the CDN service to the UE in response to receiving a message indicating that the UE is to access the CDN service; and obtain the service provision information about the at least one CDN DN.

In some other embodiments, in response to receiving a message indicating that the UE is to access the CDN service, the CDN CN may sends, to an ANDSF node, a request for policy and access network information with respect to the UE; in response to receiving the policy and access network information from the ANDSF node, the CDN CN may determine at least one CDN DN for providing the CDN service to the UE based on the policy and access network information; and then, the CDN CN may obtain the service provision information about the at least one CDN DN.

In accordance with exemplary embodiments of the present invention, the policy and access network information may comprise at least one of: access network information, operator's traffic steering policy, inter-system routing policy, inter-system mobility policy, UE related inter-APN routing policy, and some other suitable policy/information. Specifically, the operator's traffic steering policy may indicate that a specific service may be provided by a cellular network or a WIFI network. The inter-system mobility policy (ISMP) may indicate network selections rules for a UE with no more than one active access network connection (e.g., either LTE or Wi-Fi), although the UE may have multiple access network connections. The inter-system routing policy (ISRP) may indicate network selection rules for a UE with potentially more than one active access network connection (e.g., both LTE and Wi-Fi) simultaneously, wherein such a UE may employ IP flow mobility (IFOM), multiple-access PDN connectivity (MAPCON) or non-seamless Wi-Fi offload according to operator policy and user preferences. The UE related inter-APN routing policy may indicate that which APN or PDN may be preferred or not preferred for a UE to access a specific service.

In accordance with exemplary embodiments of the present invention, the service provision information may comprise an identification of the at least one CDN DN. Optionally, the service provision information may further comprise identification of the UE requesting the CDN service, information about PDN(s) in which the selected CDN DN(s) is located, information about APN(s) associated with the one or more PDN(s), and/or some other suitable information.

At step S602, service provision information about the at least one CDN DN is transmitted, to enable an inter-APN routing policy associated with the CDN service to be generated based on the service provision information.

According to some embodiments of the present invention, the service provision information may be transmitted to an ANDSF node, such that the inter-APN routing policy is generated at the ANDSF node.

According to some other embodiments of the present invention, the service provision information may be transmitted to a network gateway, for example a P-GW, such that the inter-APN routing policy is generated at the network gateway and/or an ANDSF node. Specifically, the network gateway, upon receiving the service provision information, may generate the inter-APN routing policy and send the generated policy to the ANDSF node, such that the ANDSF node may forward the policy to the UE. As an alternative, the network gateway, upon receiving the service provision information, may determine further information regarding at least one PDN or APN associated with the requested CDN service and send the further information to the ANDSF node, such that the inter-APN routing policy is generated at the ANDSF node. As another alternative, the network gateway, upon receiving the service provision information, may simply forward the service provision information to the ANDSF node, such that the inter-APN routing policy is generated at the ANDSF node.

Figure 7:
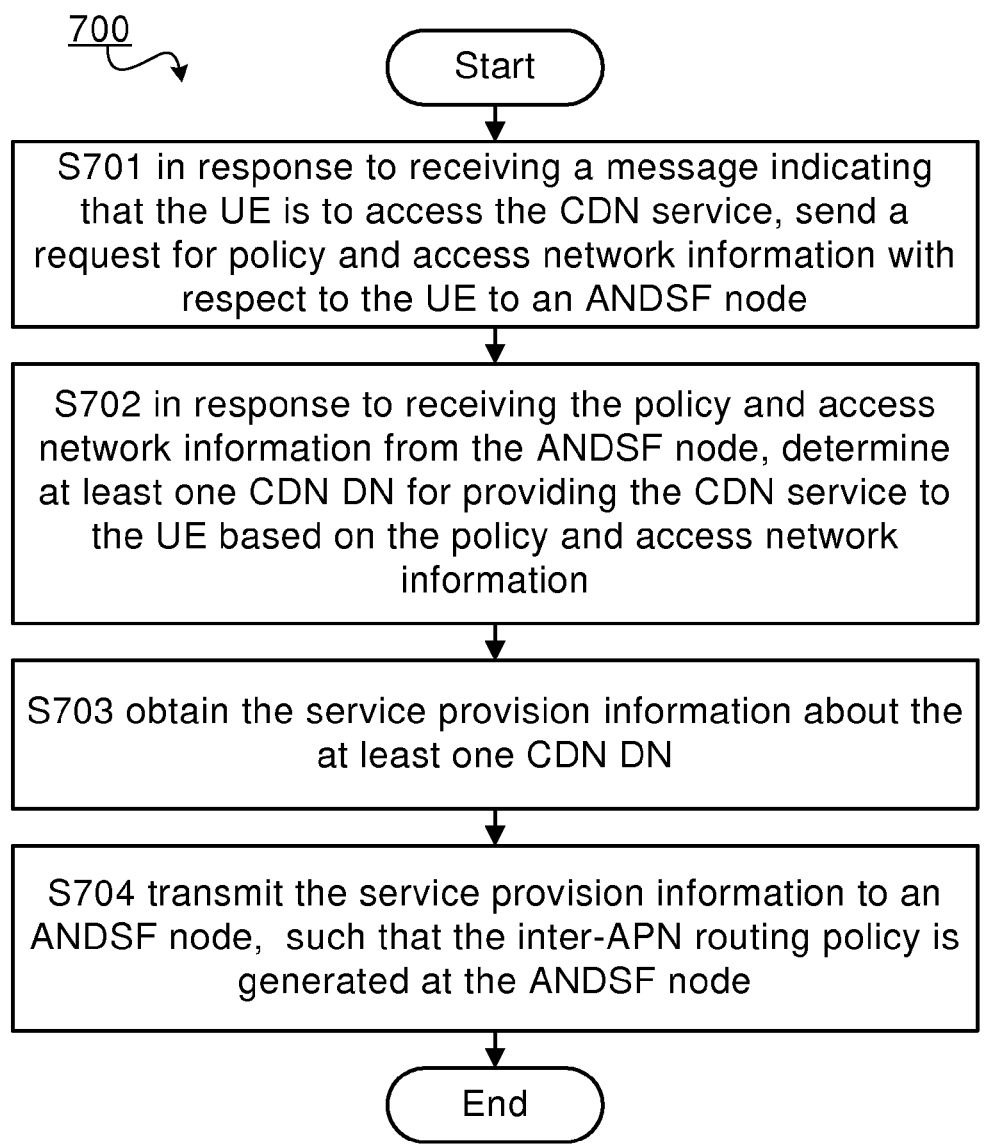
FIG. 7 illustrates a flow chart of a method 700 for dynamically providing a CDN service through a mobile network according to embodiments of the invention.

Reference is now made to FIG. 7, which illustrates a flow chart of a method 700 for dynamically providing a CDN service through a mobile network according to embodiments of the invention. The method 700 may be considered as an embodiment of the method 600 described above with reference to FIG. 6. In the following description of method 700, a CDN CN communicates with an ANDSF node directly, such that the inter-APN routing policy is generated at the ANDSF node. Optionally, in the process of selecting at least one CDN DN from candidate CDN DNs, the CDN CN requests to the ANDSF node for more information to be taken into consideration. However, it is noted that this is only for the purpose of illustrating the principles of the present invention, rather than limiting the scope thereof.

After the method 700 starts, at step S701, in response to receiving a message indicating that the UE is to access the CDN service, a request for policy and access network information with respect to the UE is sent to an ANDSF node.

According to embodiments of the present invention, at first, on the default bearer established over the existing PDN connection, a UE may send a message of Domain Name Server (DNS) request to find an IP address of a CDN content/service server. Based on information (e.g., Fully Qualified Domain Name (FQDN)) included in the message, a DNS node may find that the requested content/service is to be provided by a CDN system, and then it may forward the message of the DNS request to the CDN control system, for example, the CDN CN. In response to receiving from the DNS node the message, which indicates that the UE is to access the CDN service, the CDN CN may send to an ANDSF node a request for policy and access network information with respect to the UE. As discussed above, the policy and access network information may comprise multiple kinds of information or policies, which may make a contribution to the selection of CDN DN(s).

At step S702, in response to receiving the policy and access network information from the ANDSF node, at least one CDN DN for providing the CDN service to the UE is determined based on the policy and access network information.

Upon the ANDSF node receiving the CDN CN's request for the policy and access information, the ANDSF node may obtain (for example, collect from other nodes, extract from accessible memories, receive from a storage server, and so on) the requested information and send it to the CDN CN as a reply. When the CDN CN receives the policy and access information from the ANDSF node, it may select the CDN DN based on such policy and access information, and other CDN system internal information.

It is to be noted that the policy and access network information is optional for selecting a CDN DN. According to embodiments of the present invention, a CDN DN may be selected according to predetermined settings and/or some other rules, or may be selected randomly from candidate CDN DNs which can provide the requested CDN service.

At step S703, the service provision information about the at least one CDN DN is obtained.

When one or more CDN DNs are selected from candidate CDN DNs, their respective identification may be achieved and included into the service provision information. Additionally, the service provision information may also comprise other suitable information as discussed above.

At step S704, the service provision information is transmitted to an ANDSF node, such that the inter-APN routing policy is generated at the ANDSF node.

Figure 8:
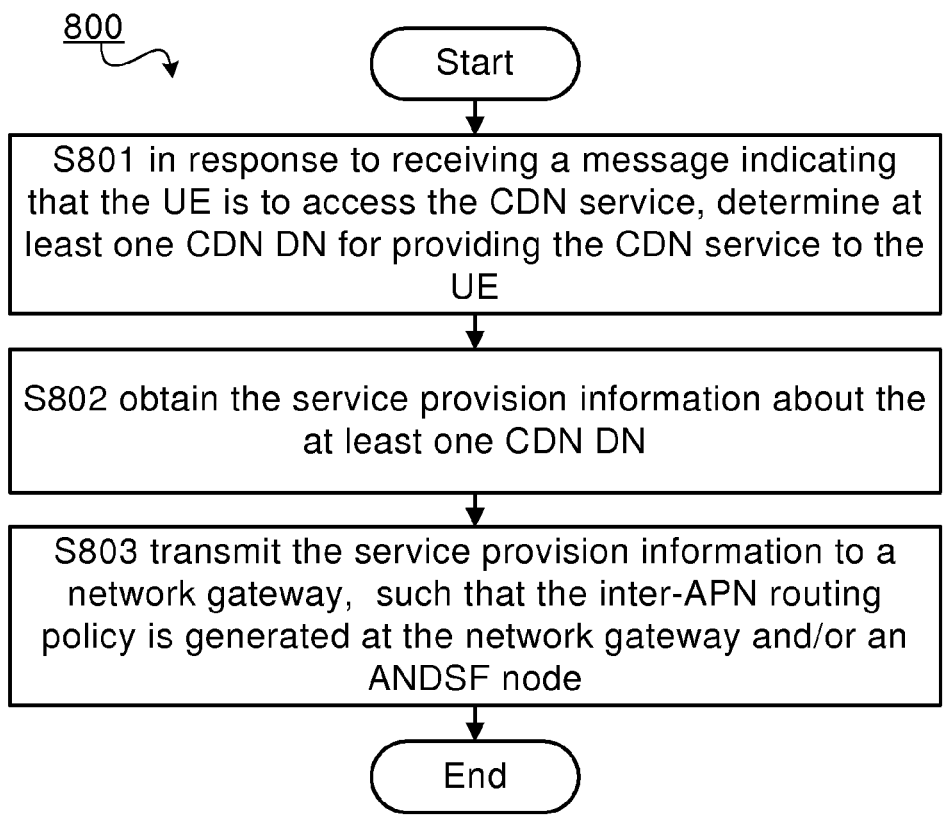
FIG. 8 illustrates a flow chart of a method 800 for dynamically providing a CDN service through a mobile network according to embodiments of the invention.

Reference is now made to FIG. 8, which illustrates a flow chart of a method 800 for dynamically providing a CDN service through a mobile network according to embodiments of the invention. The method 800 may be considered as an embodiment of the method 600 described above with reference to FIG. 6. In the following description of method 800, a CDN CN communicates with an ANDSF node via a network gateway (e.g., a P-GW), such that the inter-APN routing policy is generated at the network gateway and/or an ANDSF node. However, it is noted that this is only for the purpose of illustrating the principles of the present invention, rather than limiting the scope thereof.

After the method 800 starts, at step S801, in response to receiving a message indicating that the UE is to access the CDN service, at least one CDN DN for providing the CDN service to the UE is determined. Step S801 is different from step S701 of the method 700, since the CDN DN is selected without the policy and access network information. As such, the steps regarding request and reply of the policy and access network information are not involved in embodiments with respect to the method 800.

At step S802, the service provision information about the at least one CDN DN is obtained. Similar to step S703 of the method 700, the CDN CN may obtain the service provision information comprising the identification of the selected CDN DN(s), as well as other suitable information.

At step S803, the service provision information is transmitted to a network gateway, such that the inter-APN routing policy is generated at the network gateway and/or an ANDSF node.

In embodiments with respect to the method 800, the CDN CN transmits the service provision information to a network gateway (e.g, a P-GW), instead of to an ANDSF node directly.

In some embodiments, upon receiving the service provision information, the network gateway may forward the service provision information to the ANDSF node directly. Alternatively, the network gateway may determine further information regarding a PDN and/or an APN based on the service provision information, and then send the service provision information comprising the further information to the ANDSF node. As such, the ANDSF node may utilize the service provision information received from the network gate to generate the inter-APN routing policy. More details may be found in the description in connection with embodiments of FIG. 4.

In some other embodiments, upon receiving the service provision information, the network gateway may generate the inter-APN routing policy and provide the generated policy to the ANDSF node, such that the ANDSF node sends the inter-APN routing policy to the UE. More details may be found in the description in connection with embodiments of FIG. 5.

For the purpose of illustrating spirit and principle of the present invention, some specific embodiments thereof have been described above. It will be appreciated by a person skilled in the art that embodiments of the present invention may be varied or modified without departing from the scope of the present invention.

Figure 9:
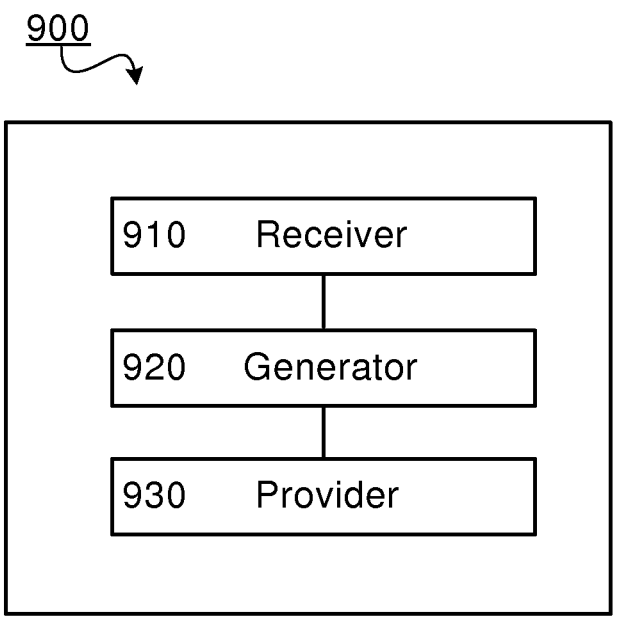
FIG. 9 illustrates a block diagram of an apparatus 900 for dynamically providing a CDN service through a mobile network according to embodiments of the invention.

Reference is now made to FIG. 9, which illustrates a block diagram of an apparatus 900 for dynamically providing a CDN service through a mobile network according to embodiments of the invention. As shown, the apparatus 900 comprises: a receiver 910 configured to receive service provision information, wherein the service provision information comprises information about at least one CDN DN for providing a CDN service requested by a UE; a generator 920 configured to generate an inter-APN routing policy associated with the CDN service based on the service provision information; and a provider 930 configured to provide the inter-APN routing policy to enable the UE to access the CDN service based on the inter-APN routing policy. In accordance with embodiments of the present invention, the apparatus 900 may be implemented at an ANDSF node, a network gateway, and/or any other suitable device.

In accordance with embodiments of the present invention, the apparatus 900 may be implemented at an ANDSF node, the service provision information may be received from a CDN CN or a network gateway, and the generator 920 may comprise: a first determining unit configured to determine at least one APN associated with the CDN service to be provided by the at least one CDN DN based on the service provision information; and a first generating unit configured to generate the inter-APN routing policy based on the at least one APN and the CDN service.

In accordance with embodiments of the present invention, the apparatus 900 may be implemented at an ANDSF node, the service provision information may be received from a network gateway, and the generator 920 may comprise: a judging unit configured to judge whether at least one APN associated with the CDN service to be provided by the at least one CDN DN is received from the network gateway; a first determining unit configured to determine, if the at least one APN is not received from the network gateway, the at least one APN based on the service provision information and/or at least one PDN associated with the at least one CDN DN; and a first generating unit configured to generate the inter-APN routing policy based on the at least one APN and the CDN service.

According to some embodiments of the present invention, the provider 930 may comprise: a first providing unit configured to provide the inter-APN routing policy from the ANDSF node to the UE.

In accordance with embodiments of the present invention, the apparatus 900 may be implemented at a network gateway, the service provision information may be received from a CDN CN, and the generator 920 may comprises: a second determining unit configured to determine at least one APN associated with the CDN service to be provided by the at least one CDN DN based on the service provision information; and a second generating unit configured to generate the inter-APN routing policy based on the at least one APN and the CDN service.

According to some embodiments of the present invention, the provider 930 may comprise: a second providing unit configured to provide the inter-APN routing policy from the network gateway to an ANDSF node.

In accordance with embodiments of the present invention, the apparatus 900 may be implemented at an ANDSF node, and the apparatus 900 may further comprise: a sender (not shown) configured to send, in response to receiving a request for policy and access network information with respect to the UE from a CDN control node (CN), the policy and access network information from the ANDSF node to the CDN CN, such that the CDN CN determines the at least one CDN DN based on the policy and access network information, wherein the policy and access network information comprises at least one of: access network information, operator's traffic steering policy, inter-system routing policy, inter-system mobility policy, and UE related inter-APN routing policy.

Figure 10:
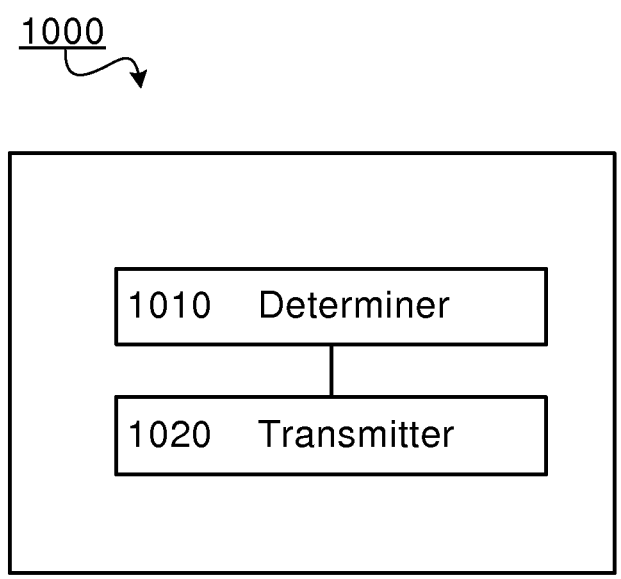
FIG. 10 illustrates a block diagram of an apparatus 1000 for dynamically providing a CDN service through a mobile network according to embodiments of the invention.

Reference is now made to FIG. 10, which illustrates a block diagram of an apparatus 1000 for dynamically providing a CDN service through a mobile network according to embodiments of the invention. As shown, the apparatus 1000 comprises: a determiner 1010 configured to determine at least one CDN DN for providing a CDN service requested by a UE; and a transmitter 1020 configured to transmit service provision information about the at least one CDN DN, to enable an inter-APN routing policy associated with the CDN service to be generated based on the service provision information. In accordance with embodiments of the present invention, the apparatus 1000 may be implemented at a network node, for example, a CDN CN, and some other suitable device.

In accordance with embodiments of the present invention, the determiner 1010 may comprise: a third determining unit configured to determine, in response to receiving a message indicating that the UE is to access the CDN service, at least one CDN DN for providing the CDN service to the UE; and a first obtaining unit configured to obtain the service provision information about the at least one CDN DN, wherein the service provision information at least comprises an identification of the at least one CDN DN.

In accordance with embodiments of the present invention, the determiner 1010 may comprise: a sending unit configured to send to an ANDSF node, in response to receiving a message indicating that the UE is to access the CDN service, a request for policy and access network information with respect to the UE, wherein the policy and access network information comprises at least one of: access network information, operator's traffic steering policy, inter-system routing policy, inter-system mobility policy, and UE related inter-APN routing policy; a fourth determining unit configured to determine, in response to receiving the policy and access network information from the ANDSF node, at least one CDN DN for providing the CDN service to the UE based on the policy and access network information; and a second obtaining unit configured to obtain the service provision information about the at least one CDN DN, wherein the service provision information at least comprises an identification of the at least one CDN DN.

In accordance with embodiments of the present invention, the transmitter 1020 may comprise: a first transmitting unit configured to transmit the service provision information to an ANDSF node, such that the inter-APN routing policy is generated at the ANDSF node.

In accordance with embodiments of the present invention, the transmitter 1020 may comprise: a second transmitting unit configured to transmit the service provision information to a network gateway, such that the inter-APN routing policy is generated at the network gateway and/or an ANDSF node.

Figure 11:
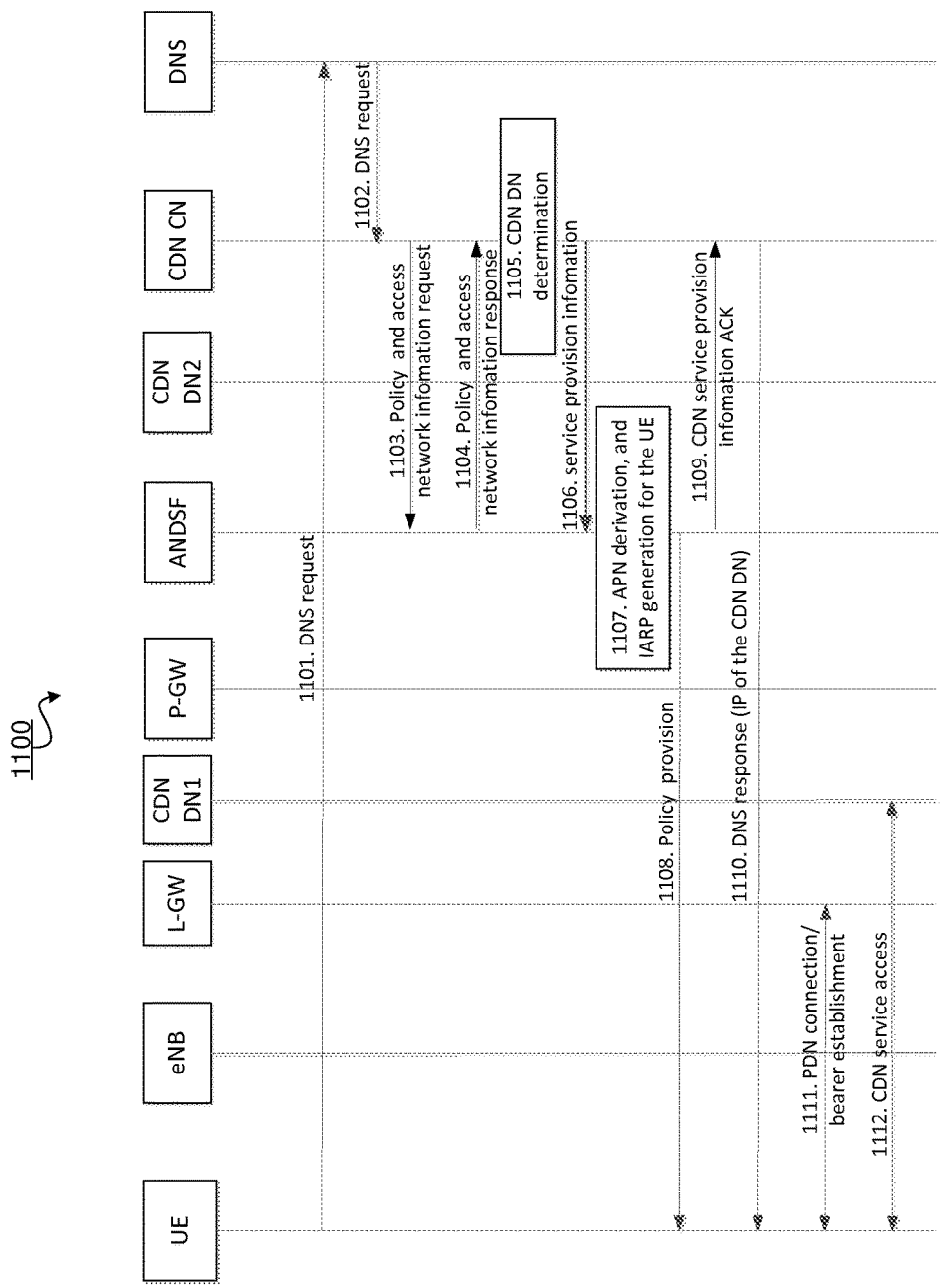
FIG. 11 illustrates a diagram of a process 1100 for dynamically providing a CDN service through a mobile network according to embodiments of the invention.

Reference is now made to FIG. 11, which illustrates a diagram of a process 1100 for dynamically providing a CDN service through a mobile network according to embodiments of the invention.

According to embodiments in connection to FIG. 11, a new interface is introduced between the ANDSF node and the CDN CN to coordinate the CDN DN selection by the CDN CN and Inter-APN routing policy generation by the ANDSF node. The ANDSF node may assist CDN CN for CDN DN selection and content distribution policy generation by providing UE capability information (Inter-APN capable or not) and operators traffic steering policy like inter-system mobility policy, inter-system routing policy, as well as Inter-APN routing policy if available through the interface. Meanwhile, a CDN DN is selected to serve a UE; the CDN CN may provide information about the selected CDN DN and other information to the ANDSF node, in order to generate Inter-APN routing policy for the UE to access the requested CDN service.

As shown in FIG. 11, on the default bearer established over the existing PDN connection, the UE sends a DNS request message at 1101 to a DNS node, to find the identification of a CDN DN. Based on information (e.g., FQDN) included in the request message, the DNS node finds that the requested content/service is to be provided by a CDN system, then it forwards the DNS request message to the CDN CN at 1102. Before selecting a CDN DN for the UE, the CDN CN enquires the ANDSF node about policy and access network information by sending a request message to the ANDSF node at 1103. The UE ID or IP address and requested content or service information may be included in the message. The ANDSF node provides, to the CDN CN, the policy and access network information by a response message at step 1104, such that the CDN CN may select a CDN DN more intelligently. The policy and access network information may comprise at least one of: operator's traffic steering policy information, UE related Inter-APN capability information, Inter-system routing policy, inter-system mobility policy, inter-APN routing policy if available and possible UE related inter-APN routing policy information to the CDN CN. Based on the policy and access network information from the ANDSF node, the CDN CN may determine a specific CDN DN or multiple CDN DNs to serve the UE at 1105. In the embodiments of FIG. 11, there are two CDN DNs (CDN DN 1 and CDN DN 2, as shown), wherein CDN DN 1 is selected by the CDN CN. At 1106, the CDN CN provides service provision information to the ANDSF node by sending a request message, which may include the ID of selected CDN DN or the ID or name of PDN where the CDN DN is located, UE ID, and description information of the requested service/content. Based on the service provision information received from the CDN CN, the ANDSF node derives the APN associated with the service/content requested by the UE, and generates the Inter-APN routing policy for the UE at 1107. As an alternative, if there was an Inter-APN routing policy in the ANDSF node, it may be updated with the newly-generated Inter-APN routing policy. The ANDSF node may provide the Inter-APN routing policy to the UE by sending a message e.g., as defined by an existing specification at 1108.

The ANDSF node may reply the CDN CN by a response message to acknowledge the successful reception of the request message at 1109. Upon the confirmation of the ANDSF node, the CDN CN may reply the UE by a DNS response message at 1110, to provide the IP address of the selected CDN DN node. Based on the Inter-APN routing policy, the UE may initiate the PDN connection to access the CDN service by providing the specific APN informed by the ANDSF node to the L-GW at 1111. Then, the UE may set up an application level session with the informed CDN DN over the new PDN connection established to get the required content or service at 1112.

According to further embodiments of the present invention, the CDN CN system may dynamically update the content/service distribution policy information to per PLMN or RAN/CN level to the ANDSF node for IARP generation. Besides, the ANDSF node may dynamically update the IARP per UE or per PLMN or RAN/CN level to the CDN CN for traffic distribution policy generation and/or CDN DN selection. Specifically, the CDN CN may provide that a specific type of service/content is cached by CDN DNs located in a specific PDN. Based on the info provided from the CDN CN, the ANDSF node may generate the IARP to UEs actively. The ANDSF node may provide that a specific type of service/content is preferred or prohibited to be delivered by a specific access network or specific PDN. Based on the information provided from the ANDSF node, the CDN CN may generate traffic distribution policy in line with operator's preference. e.g., a specific type of content/service is preferred or avoided to be cached by CDN DNs located in a specific PDN.

Figure 12:
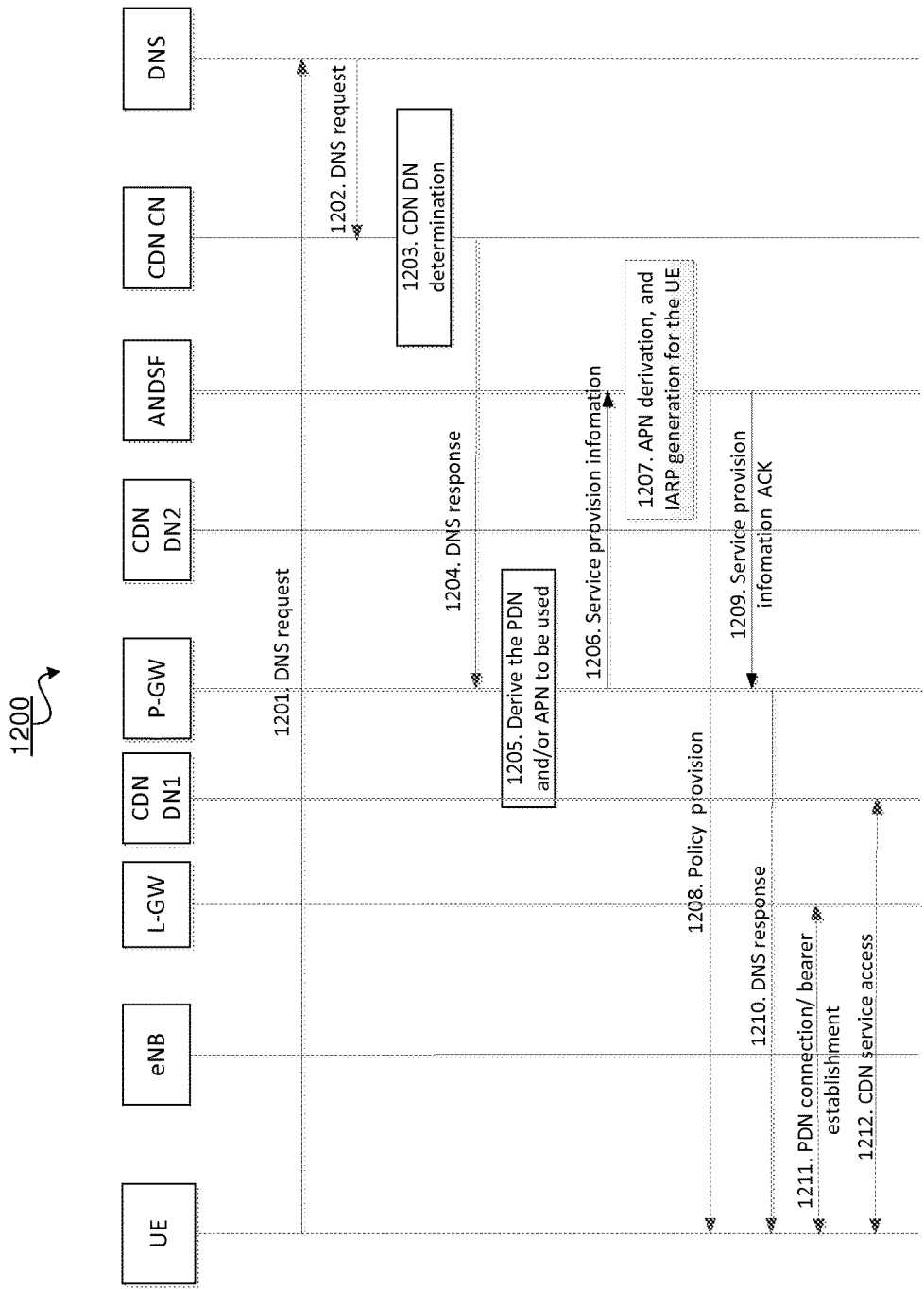
FIG. 12 illustrates a diagram of a process 1200 for dynamically providing a CDN service through a mobile network according to embodiments of the invention.

Reference is now made to FIG. 12, which illustrates a diagram of a process 1200 for dynamically providing a CDN service through a mobile network according to embodiments of the invention. Different from embodiments of FIG. 11 in which the CDN CN communicates with the ANDSF node in an explicit way, the embodiments of FIG. 12 illustrate that the CDN CN communicates with the ANDSF node via a network gateway (e.g., P-GW) in an implicit way.

According to embodiments in connection to FIG. 12, a new interface is introduced between the ANDSF node and the network gateway (e.g., P-GW/GGSN) or an existing interface is enhanced for the network gateway to assist the ANDSF node for inter-APN policy generation for a UE. In case the network gateway finds that the existing PDN connection couldn't be used to provide to the specific service to a UE based on DPI analysis of the response message from the CDN CN to UE, the network gateway may initiate a process to provide necessary information to the ANDSF node over the interface. More specifically, by Deep Packet Inspection (DPI) function, in case the P-GW/GGSN finds that the CDN DN selected by the CDN CN is located in a PDN that can't be access by the current PDN, it initiates the process with the ANDSF node to update the IARP for the UE. The P-GW/GGSN may provide necessary information to the ANDSF node for the policy generation. In some embodiments, the P-GW provides the identification of the CDN DN, service description info, UE ID to the ANDSF node, and the ANDSF node derives the PDN and related APN to be used by the UE to access the CDN service. In some alternative embodiments, based on the identification of the CDN DN, the P-GW derives the PDN to be used, and provides the PDN info, CDN service description info, UE ID to the ANDSF node, and the ANDSF node derives the APN to be used. In some alternative embodiments, based on the identification of the CDN DN, the P-GW derives the PDN and the corresponding APN to be used, and provide them together with CDN service description info and UE ID to the ANDSF node. Based on info provided the by the network gateway, the ANDSF node generates IARP for the UE and provides the IARP to the UE for accessing the CDN service.

As shown in FIG. 12, on the default bearer established over the existing PDN connection, the UE sends a DNS request message at 1201 to a DNS node, to find the identification of a CDN DN. Based on information included in the request message, the DNS node finds that the requested content/service is to be provided by a CDN system, then it forwards the DNS request message to the CDN CN at 1202. The CDN CN determines a specific CDN DN or multiple CDN DNs to be used to serve the UE at 1203. In the embodiments of FIG. 12, there are two CDN DNs (CDN DN 1 and CDN DN 2, as shown), wherein CDN DN 1 is selected by the CDN CN. Such determination may be made based on internal information such as load status of related CDN DNs, and possible other information. The CDN CN replies by a DNS response message at 1204, to provide the IP address of the selected CDN DN node to serve the UE with requested content or service. At 1205, based the DNS response message from the CDN CN, the P-GW may derive the APN to be used based on the CDN DN ID and PDN where the CDN DN is located, or the P-GW may derive information of the PDN from the CDN DN ID, for example, in case the P-GW finds that CDN DN represented by the IP address can't be accessed by the existing PDN connection. At 1206, the P-GW sends service provision information to the ANDSF by a message. In the message may include the ID of the CDN DN, or name or ID of PDN where the CDN DN is located, or the APN associated with the PDN derived from the CDN DN, UE ID information, related service/content description as indicated in the DNS request message. According to some embodiments of the present invention, the P-GW may block the DNS response message temporarily till the response message from the ANDSF node is received. At 1207, based on the info from the P-GW, the ANDSF node may derive the APN associated with the service/content requested by the UE if not directly provided by the P-GW, and generates or updates the Inter-APN routing policy for the UE. At 1208, the ANDSF node may provide the Inter-APN routing policy to the UE by sending a message, e.g., as defined by an existing specification. At 1209, the ANDSF node may replies the P-GW by a response message to acknowledge the successful reception of the request message. Upon the confirmation of the ANDSF node, the P-GW may forward the DNS response message to the UE at 1210. Based on the Inter-APN routing policy, the UE may initiate the PDN connection to access the CDN service by providing the specific APN informed by the ANDSF node to the L-GW at 1211. Then, the UE may set up an application level session with the informed CDN DN over the new PDN connection established to get the required content or service at 1212.

Figure 13:
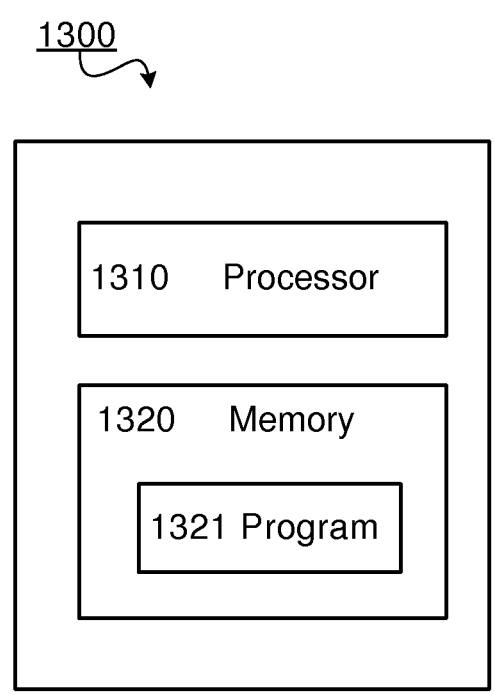
FIG. 13 illustrates a block diagram of an apparatus 1300 random access in a wireless network according to embodiments of the invention.

Reference is now made to FIG. 13, which illustrates a block diagram of an apparatus 1300 that is suitable for implementing the exemplary embodiments of the invention. The apparatus 1300 may comprise at least one processor 1310; and at least one memory 1320 including compute program instructions 1321, wherein the at least one memory 1320 and computer program instructions 1321 are configured to, with the at least one processor 1310, cause the apparatus 1300 at least to perform methods according to embodiments of the present invention.

The at least one processor is suitable for use with embodiments of the present disclosure and may include, by way of example, both general and special purpose processors already known or developed in the future. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compilable or interpretable programming languages. In accordance with embodiments, the computer executable instructions may be configured, with the at least one processor, to cause the apparatus to at least perform according to any of methods 200 to 800 as discussed above. It is to be noted that although the apparatus 900 or apparatus 1000 may be included in a network node (such as an ANDSF node, a network gateway), and although the apparatus 1300 may be included in a network node (such as a CDN CN), the apparatus may be associated with the network node (for example, interfaces with the network node), instead of being a part of the network node.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIGS. 2 to 8 may be viewed as method steps, and/or as operations that result from operation of computer program code, and/or as a plurality of coupled logic circuit elements constructed to carry out the associated function(s). At least some aspects of the exemplary embodiments of the inventions may be practiced in various components such as integrated circuit chips and modules, and that the exemplary embodiments of this invention may be realized in an apparatus that is embodied as an integrated circuit, FPGA or ASIC that is configurable to operate in accordance with the exemplary embodiments of the present invention.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Various modifications, adaptations to the foregoing exemplary embodiments of this invention may become apparent to those skilled in the relevant arts in view of the foregoing description, when read in conjunction with the accompanying drawings. Any and all modifications will still fall within the scope of the non-limiting and exemplary embodiments of this invention. Furthermore, other embodiments of the inventions set forth herein will come to mind to one skilled in the art to which these embodiments of the invention pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A method for dynamically providing a content distribution network (CDN) service at an Access Network Discovery and Selection Function (ANDSF) node, through a mobile network, the method comprising:
   receiving service provision information from a Content Delivery Network (CDN) control node or a Network (NW) gateway node, wherein the service provision information comprises information about at least one CDN distribution node (DN) for providing a CDN service requested by a user equipment (UE);
   generating an inter-access point name (APN) routing policy associated with the CDN service, based on the service provision information; and
   providing the inter-APN routing policy to the UE, to enable the UE to access the CDN service, based on the inter-APN routing policy;
   wherein the method further comprises, in response to receiving a request for policy and access network information with respect to the UE from the CDN control node, sending the policy and access network information from the ANDSF node to the CDN control node, such that the CDN control node determines the at least one CDN DN, based on the policy and access network information; and
   wherein the policy and access network information comprises at least one of: access network information, a traffic steering policy, an inter-system routing policy, an inter-system mobility policy, and a UE-related inter-APN routing policy.

2. The method of claim 1, wherein generating the inter-APN routing policy comprises:
   determining at least one APN associated with the CDN service to be provided by the at least one CDN DN, based on the service provision information; and
   generating the inter-APN routing policy, based on the at least one APN and the CDN service.

3. The method of claim 1, wherein generating the inter-APN routing policy comprises:
   judging whether at least one APN associated with the CDN service to be provided by the at least one CDN DN is received from the NW gateway node;
   if the at least one APN is not received from the NW gateway node, determining the at least one APN, based on the service provision information and/or at least one packet data network associated with the at least one CDN DN; and
   generating the inter-APN routing policy, based on the at least one APN and the CDN service.

4. A method for dynamically providing a content distribution network (CDN) service through a mobile network, the method performed by a CDN control node and comprising:
   determining at least one CDN distribution node (DN) for providing a CDN service requested by a user equipment (UE); and
   transmitting service provision information about the at least one CDN DN to an Access Network Discovery and Selection Function (ANDSF) node, to enable an inter-access point name (APN) routing policy associated with the CDN service to be generated by the ANDSF node, based on the service provision information;
   wherein determining the at least one CDN DN for providing a CDN service requested by the UE comprises:
      in response to receiving a message indicating that the UE is to access the CDN service, sending, to the ANDSF node, a request for policy and access network information with respect to the UE, wherein the policy and access network information comprises at least one of: access network information, a traffic steering policy, an inter-system routing policy, an inter-system mobility policy, and a UE-related inter-APN routing policy;
      in response to receiving the policy and access network information from the ANDSF node, determining the at least one CDN DN for providing the CDN service to the UE, based on the policy and access network information; and
      obtaining the service provision information about the at least one CDN DN, wherein the service provision information at least comprises an identification of the at least one CDN DN.

5. An Access Network Discovery and Selection Function (ANDSF) node for dynamically providing a content distribution network (CDN) service through a mobile network, the ANDSF node comprising:
   a receiver configured to receive service provision information from a CDN control node or a Network (NW) gateway node, wherein the service provision information comprises information about at least one CDN distribution node (DN) for providing a CDN service requested by a user equipment (UE);
   a generator configured to generate an inter-access point name (APN) routing policy associated with the CDN service, based on the service provision information; and
   a provider configured to provide the inter-APN routing policy from the ANDSF node to the UE, to enable the UE to access the CDN service, based on the inter-APN routing policy;
   the ANDSF node further comprising a sender configured to send, in response to receiving a request for policy and access network information with respect to the UE from the CDN control node, the policy and access network information to the CDN control node, such that the CDN control node determines the at least one CDN DN based on the policy and access network information; and wherein the policy and access network information comprises at least one of: access network information, a traffic steering policy, an inter-system routing policy, an inter-system mobility policy, and a UE-related inter-APN routing policy.

6. The ANDSF node of claim 5, wherein the generator comprises:
   a first determining unit configured to determine at least one APN associated with the CDN service to be provided by the at least one CDN DN, based on the service provision information; and
   a first generating unit configured to generate the inter-APN routing policy, based on the at least one APN and the CDN service.

7. The ANDSF node of claim 5, wherein the service provision information is received from the NW gateway node, and wherein the generator comprises:
   a judging unit configured to judge whether at least one APN associated with the CDN service to be provided by the at least one CDN DN is received from the NW gateway node;
   a first determining unit configured to determine, if the at least one APN is not received from the NW gateway node, the at least one APN based on the service provision information and/or at least one packet data network (PDN) associated with the at least one CDN DN; and
   a first generating unit configured to generate the inter-APN routing policy, based on the at least one APN and the CDN service.

8. A Content Distribution Network (CDN) control node for dynamically providing a CDN service through a mobile network, the CDN control node comprising:
   a determiner configured to determine at least one CDN distribution node (DN) for providing a CDN service requested by a user equipment (UE); and
   a transmitter configured to transmit service provision information about the at least one CDN DN to an Access Network Discovery and Selection Function (ANDSF) node, to enable an inter-access point name (APN) routing policy associated with the CDN service to be generated by the ANDSF node, based on the service provision information;
   the CDN control node further comprising:
   a sending unit configured to send to the ANDSF node, in response to receiving a message indicating that the UE is to access the CDN service, a request for policy and access network information with respect to the UE, wherein the policy and access network information comprises at least one of: access network information, a traffic steering policy, an inter-system routing policy, an inter-system mobility policy, and a UE-related inter-APN routing policy;
   a determining unit configured to determine, in response to receiving the policy and access network information from the ANDSF node, the at least one CDN DN for providing the CDN service to the UE, based on the policy and access network information; and
   an obtaining unit configured to obtain the service provision information about the at least one CDN DN, wherein the service provision information at least comprises an identification of the at least one CDN DN.

* * * * *